United States Patent
Reynolds

(10) Patent No.: US 12,092,155 B2
(45) Date of Patent: Sep. 17, 2024

(54) QUICK-CHANGE SPLIT SHAFT

(71) Applicant: Belvac Production Machinery, Inc., Lynchburg, VA (US)

(72) Inventor: William Storrs Reynolds, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 372 days.

(21) Appl. No.: 17/426,266

(22) PCT Filed: Jan. 27, 2020

(86) PCT No.: PCT/US2020/015269
§ 371 (c)(1),
(2) Date: Jul. 28, 2021

(87) PCT Pub. No.: WO2020/159894
PCT Pub. Date: Aug. 6, 2020

(65) Prior Publication Data
US 2022/0106979 A1   Apr. 7, 2022

Related U.S. Application Data

(60) Provisional application No. 62/797,514, filed on Jan. 28, 2019.

(51) Int. Cl.
*F16C 3/02* (2006.01)
*F16D 1/10* (2006.01)

(52) U.S. Cl.
CPC .............. *F16C 3/023* (2013.01); *F16D 1/101* (2013.01); *F16C 2226/80* (2013.01);
(Continued)

(58) Field of Classification Search
CPC .. F16C 3/023; F16C 2226/80; F16C 2237/00; F16C 2361/41; F16D 1/0876;
(Continued)

(56) References Cited

U.S. PATENT DOCUMENTS 1,752,865 A * 4/1930 Thorpe .................. A01K 87/02
403/27
4,697,949 A * 10/1987 Perez .................... F16B 21/086
403/359.3
(Continued)

FOREIGN PATENT DOCUMENTS

CN          2561935 Y       7/2003
CN        201180746 Y       1/2009
(Continued)

OTHER PUBLICATIONS

International Search Report and Written Opinion in International Application No. PCT/US2020/015269, mailed May 4, 2020 (14 pages).

*Primary Examiner* — Josh Skroupa
(74) *Attorney, Agent, or Firm* — NIXON PEABODY LLP

(57) ABSTRACT

A split shaft includes a proximal shaft section having a first proximal shaft end and a second proximal shaft end. The first proximal shaft end is configured to couple to the first machine arrangement. The split shaft further includes a distal shaft section having a first distal shaft end and a second distal shaft end. The first distal shaft end is configured to couple to the second machine arrangement. The second distal shaft end is configured to engage with the second proximal shaft end to convey the drive power from the first machine arrangement to the second machine arrangement. The second proximal shaft end includes a first indicator, and the second distal shaft end includes a second indicator. Alignment of the first indicator and the second indicator conveys timing for the drive power.

22 Claims, 13 Drawing Sheets

(52) U.S. Cl.
CPC .... *F16C 2361/41* (2013.01); *F16D 2001/103* (2013.01); *F16D 2300/20* (2021.01)

(58) Field of Classification Search
CPC ............... F16D 1/101; F16D 2001/103; F16D 2300/20; Y10S 403/04; Y10T 403/1616; Y10T 403/1624; Y10T 403/20; Y10T 403/7026; Y10T 403/7028; Y10T 403/7031; Y10T 403/7032; Y10T 403/7033; Y10T 403/7035
USPC ............ 403/13, 14, 27, 359.1, 359.2, 359.3, 403/359.4, 359.5, 359.6, DIG. 4
See application file for complete search history.

(56) References Cited

U.S. PATENT DOCUMENTS

| | | | | |
|---|---|---|---|---|
| 5,667,332 | A | * | 9/1997 | Lindholm ............... F16D 1/116 403/359.5 |
| 6,203,349 | B1 | * | 3/2001 | Nakazawa ........... H01R 13/623 439/314 |
| 8,298,633 | B1 | * | 10/2012 | Chen ...................... A41G 1/007 403/375 |
| 9,291,292 | B2 | * | 3/2016 | Gauss ..................... F16L 21/00 |
| 10,374,340 | B2 | * | 8/2019 | Cook .................. A61B 5/6858 |
| 2005/0137020 | A1 | | 6/2005 | Beechie |
| 2015/0080136 | A1 | | 3/2015 | Kenno |
| 2015/0233509 | A1 | | 8/2015 | Tiberghien et al. |
| 2018/0017197 | A1 | | 1/2018 | Meister et al. |

FOREIGN PATENT DOCUMENTS

| | | | | | |
|---|---|---|---|---|---|
| CN | 104453734 | A | | 3/2015 | |
| CN | 204419216 | U | | 6/2015 | |
| CN | 104847992 | A | | 8/2015 | |
| CN | 107620846 | A | | 1/2018 | |
| CN | 206874297 | U | | 1/2018 | |
| CN | 108713087 | A | | 10/2018 | |
| DE | 19506517 | A1 | * | 8/1995 | .......... F16D 1/0876 |
| DE | 20017252 | U1 | | 2/2002 | |
| DE | 102011007379 | | * | 10/2012 | ............ F16D 1/101 |
| DE | 102011007379 | A1 | | 10/2012 | |
| EP | 3409964 | A1 | | 12/2018 | |
| GB | 971340 | A | | 9/1964 | |
| WO | 2017148978 | A1 | | 9/2017 | |

* cited by examiner

QUICK-CHANGE SPLIT SHAFT

CROSS-REFERENCE TO RELATED APPLICATIONS

This application is a U.S. National Stage Entry of International Application No. PCT/US2020/015269, filed Jan. 27, 2020, which claims priority to and benefit of U.S. Provisional Patent Application Ser. No. 62/797,514, filed Jan. 28, 2019, each of which is hereby incorporated by reference herein in its entirety.

FIELD

The present invention relates generally to the field of equipment for bottle or can processing systems. More specifically, the invention relates to a quick-change split shaft that allows processing and drive machine arrangements connected by a shaft to be switched out or modified without removing the shaft from the arrangements.

BACKGROUND

Machine lines for bottle and can manufacturing generally have multiple machine arrangements that perform the various driving, processing, and forming steps. These machine arrangements are often connected by one or more shafts that convey drive power, mechanical timing, or both between the machine arrangements.

Machine arrangements within a machine line typically are configured for a specific type of bottle or can based on, for example, the shape, size, or both of the bottle or can. Thus, to change the specific type of bottle or can that a machine line processes or forms, one or more machine arrangements must be removed from the machine line and replaced with another machine arrangement. Alternatively, one or more parts of a machine arrangement must be removed from within the machine arrangement and replaced with other parts.

The process of removing and replacing a machine arrangement can be inconvenient, time-consuming, expensive, and/or cumbersome when the machine arrangement to be removed is connected by one or more shafts to another machine arrangement that is not being removed. The machine arrangement to be removed must be disassembled to disconnect the one or more shafts. The machine arrangement to be installed must similarly be disassembled to connect the one or more shafts to the machine arrangement. Even in the situation where one or more parts are to be replaced within a machine arrangement with other parts, this operation often requires disassembling the machine arrangement to remove and replace the parts. This operation too can be inconvenient, time-consuming, expensive, and/or cumbersome.

It would be desirable to have the ability to switch out machine arrangements from a machine line without having to disconnect the shafts connecting the machine arrangements to other machine arrangements within the machine line.

SUMMARY

One exemplary embodiment of the invention relates to a section of a machine line configured to process articles. The section includes a first machine arrangement configured to provide drive power, and a second machine arrangement configured to process the articles within the section of the machine line. The machine line further includes a split shaft configured to convey the drive power from the first machine arrangement to the second machine arrangement, and to power the processing, at least in part, of the articles by the second machine arrangement. The split shaft includes a proximal shaft section having a first proximal shaft end and a second proximal shaft end. The first proximal shaft end is configured to couple to the first machine arrangement. The split shaft also includes a distal shaft section having a first distal shaft end and a second distal shaft end. The first distal shaft end is configured to couple to the second machine arrangement. The second distal shaft end is configured to engage with the second proximal shaft end to convey the drive power from the first machine arrangement to the second machine arrangement. The second proximal shaft end includes a first indicator, and the second distal shaft end includes a second indicator. Alignment of the first indicator and the second indicator conveys timing for the drive power.

Another exemplary embodiment of the invention provides a split shaft configured to convey drive power from a first machine arrangement within a machine line to a second machine arrangement within the machine line to power the processing, at least in part, of the articles by the second machine arrangement. The split shaft includes a proximal shaft section having a first proximal shaft end and a second proximal shaft end. The first proximal shaft end is configured to couple to the first machine arrangement. The split shaft further includes a distal shaft section having a first distal shaft end and a second distal shaft end. The first distal shaft end is configured to couple to the second machine arrangement. The second distal shaft end is configured to engage with the second proximal shaft end to convey the drive power from the first machine arrangement to the second machine arrangement. The second proximal shaft end includes a first indicator, and the second distal shaft end includes a second indicator. Alignment of the first indicator and the second indicator conveys timing for the drive power.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

Figure 1A:
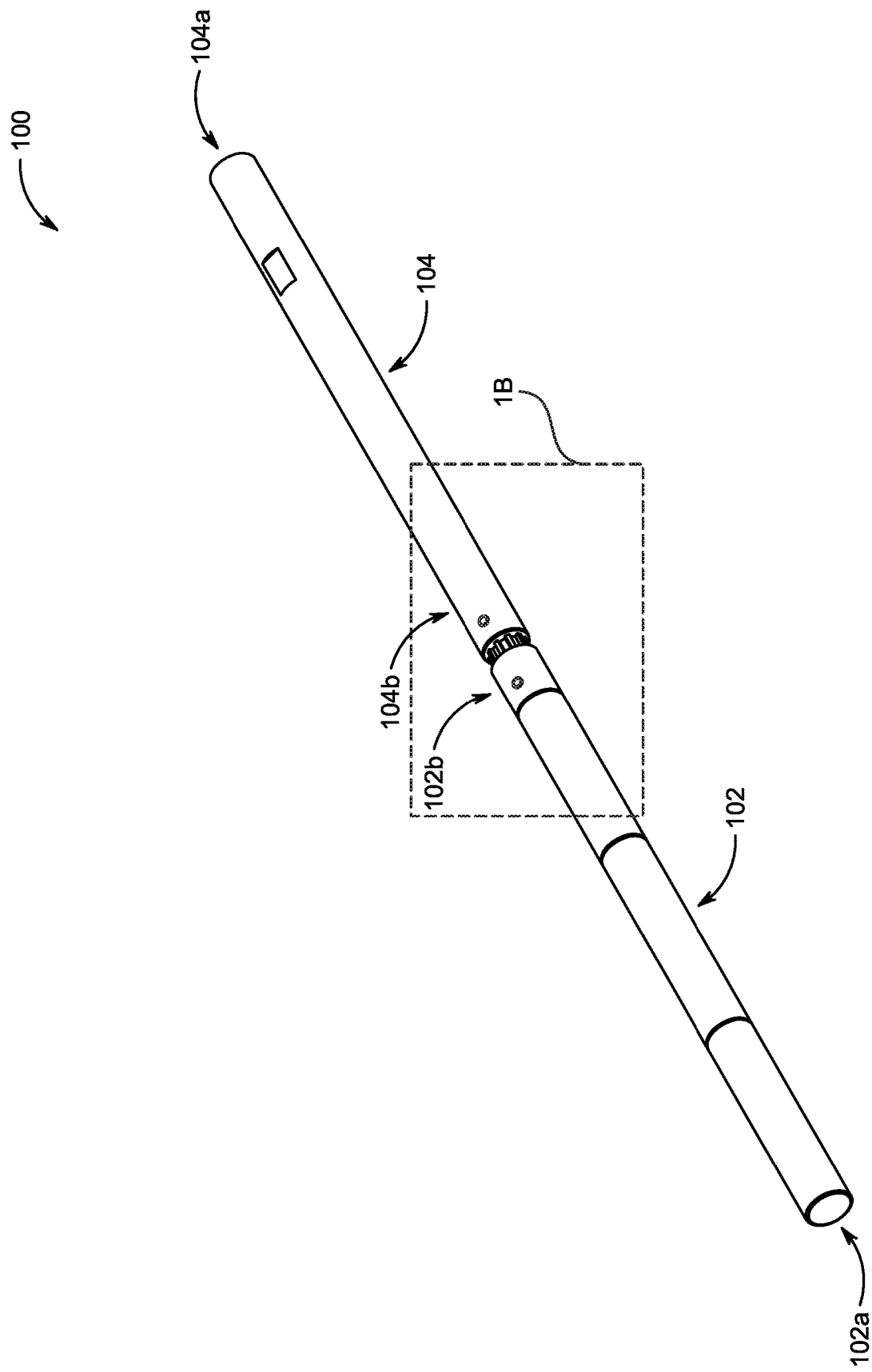
FIG. 1A is a schematic view of a split shaft, according to an embodiment of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention.

DETAILED DESCRIPTION

Machine arrangements may be used to form, process or otherwise perform a working action on an article. The article can be a can, a jar, a bottle, a food or beverage container, or any other similar article. The article generally has an open end, an opposing closed end, and a sidewall extending from the open end to the closed end. Alternatively, the article may be open at both ends. A top, lid, or other closure may be added to the article during an operation in the machine arrangement or at a later stage. For exemplary purposes only, the below description will describe the mechanisms and methods for use on a can. However, it will be recognized that any other type of article (such as those described above) may be used.

Along a machine line, the article is fed into a machine arrangement by an infeed mechanism to fill pockets in a star wheel, such as an infeed star wheel or a turret star wheel. The articles are then passed from the infeed star wheel to a turret star wheel. While each article is in a pocket of the turret star wheel, a corresponding trimmer assembly moves tooling toward and away from the article to perform a working operation, such as trimming.

The article then may be passed from the turret star wheel to a transfer star wheel, which transfers the article to another machine arrangement in the machine line that will perform another stage of the working operation on the article. When all processing stages are complete, the article is discharged from the machine line.

Machine arrangements within a machine line are connected by one or more shafts to convey drive power, mechanical timing, or both between the machine arrangements. The present invention solves the above-discussed problems of conventional shafts by providing a split shaft for conveying drive power, mechanical timing, or both between machine arrangements. The split shaft allows for one machine arrangement to be swapped out with another machine arrangement within the machine line without having to disassemble the machine arrangement. More specifically, the split shaft is formed of two sections. The section of the split shaft coupled to the machine arrangement to be removed from the machine line can simply be disengaged or decoupled from the other section of the split shaft coupled to the machine arrangement to be kept with the machine line. The ability to separate the split shaft into two separate portions saves time and is less cumbersome when making changes to the machine line as compared to conventional shafts. Further, both sections of the split shaft can include indicators that allow for the two sections to be subsequently engaged so that the rotational positions of the two sections match after being disengaged to swap out machine arrangements or parts of machine arrangements.

Figure 1B:
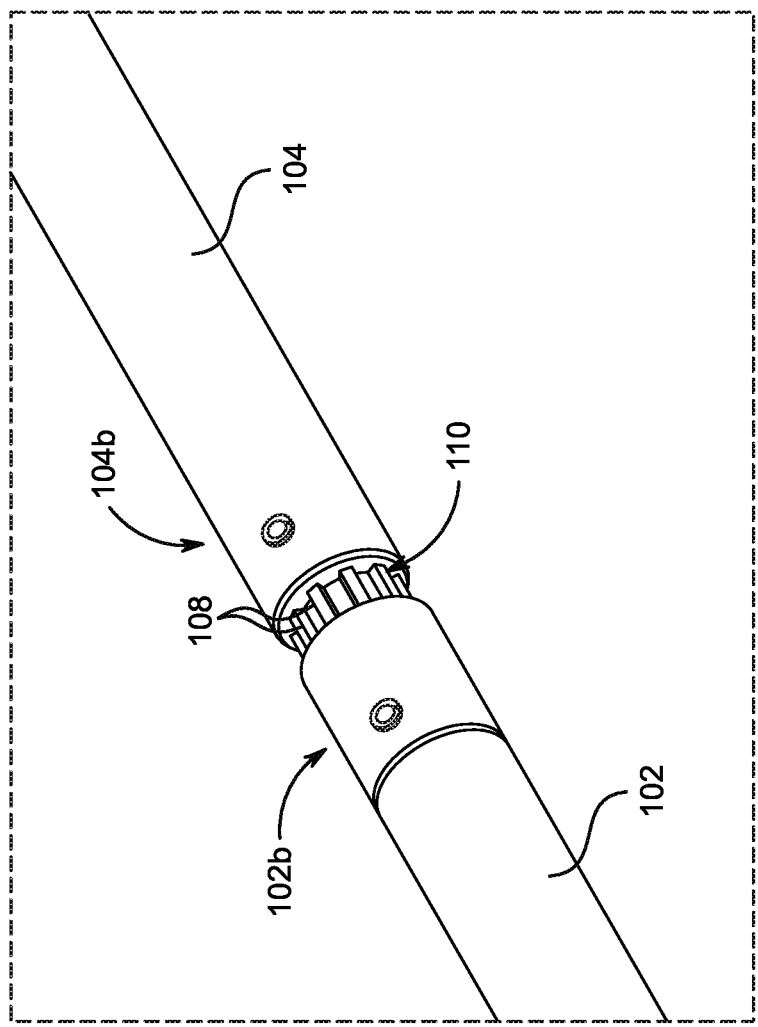
FIG. 1B is a detailed schematic view of the portion 1B of the split shaft of FIG. 1A, according to an embodiment of the present invention.
Figure 1C:
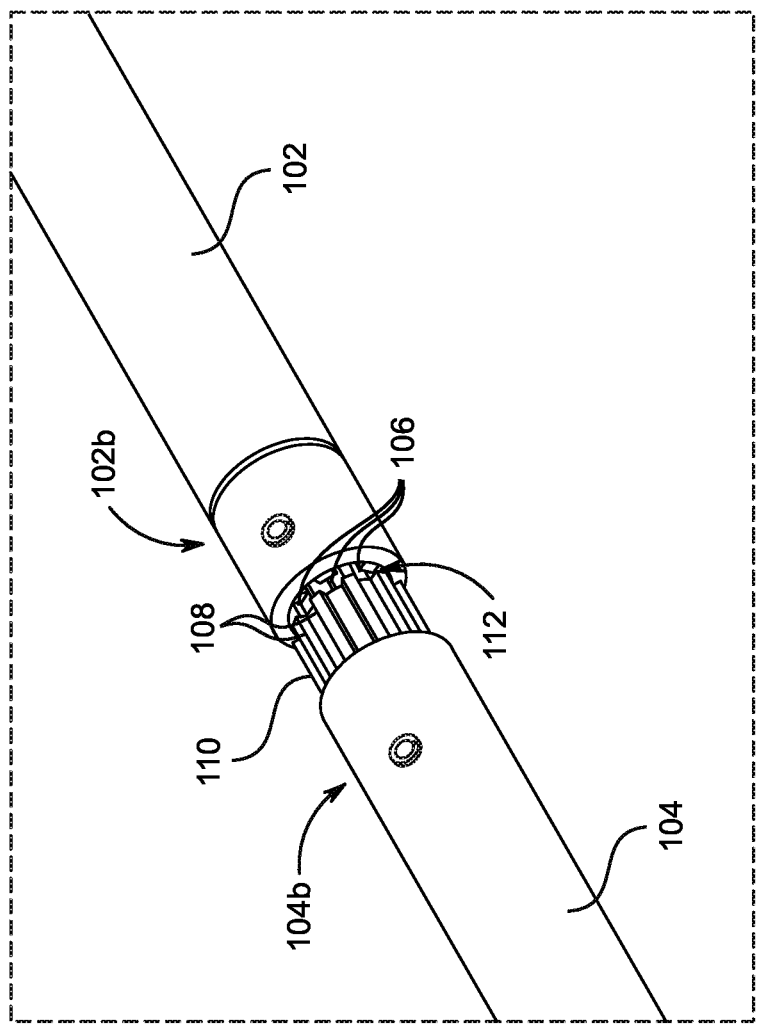
FIG. 1C is opposite detailed schematic view of the portion 1B of the split shaft of FIG. 1A, according to an embodiment of the present invention.
Figure 4A:
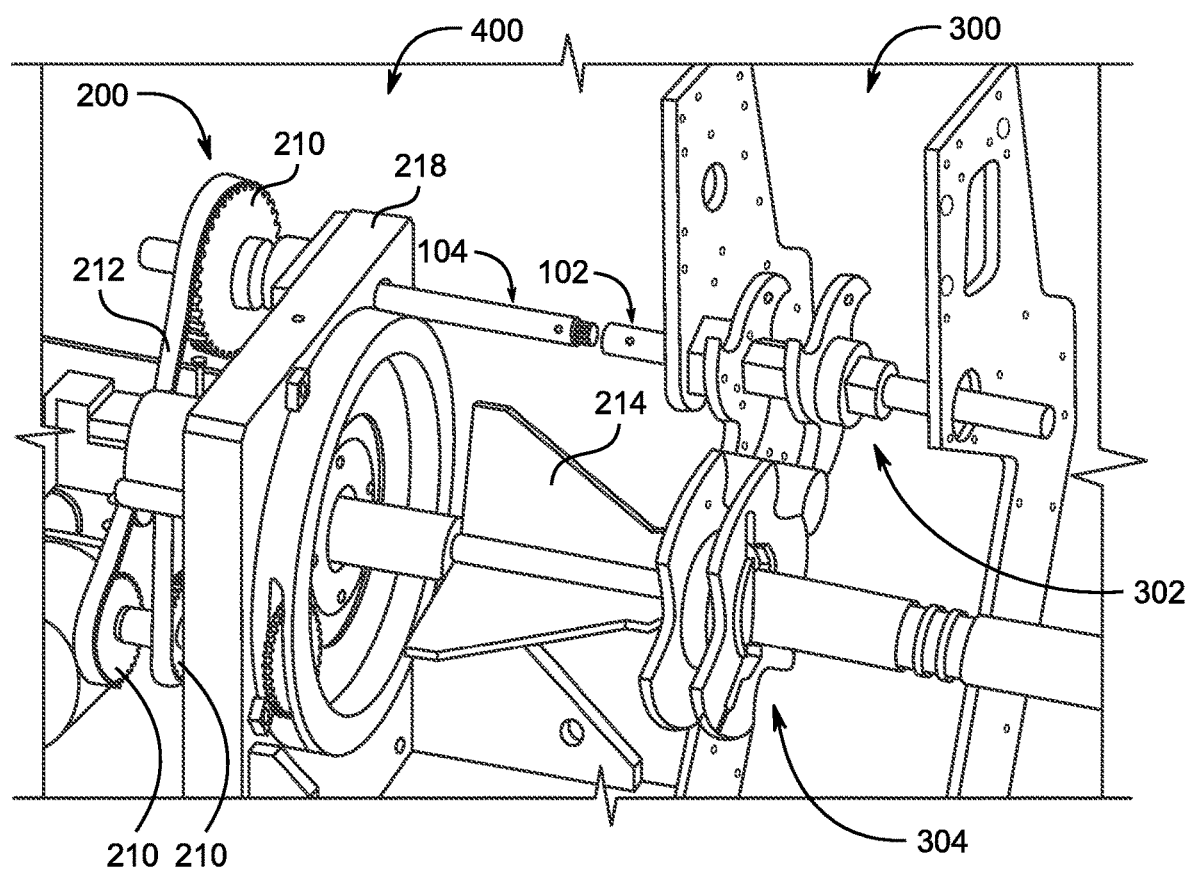
FIG. 4A is a schematic view of a section of a machine line including the machine arrangements of FIGS. 2A to 3B, according to an embodiment of the present invention.

FIG. 1A is a schematic view of a split shaft 100, according to an embodiment of the present invention. FIGS. 1B and 1C are detailed schematic views of the portion 1B illustrated in FIG. 1A of the split shaft 100, according to an embodiment of the present invention. The shaft 100 can be used for any shaft within a machine line that connects one machine arrangement to another machine arrangement. For example, the shaft 100 can connect a trimmer infeed drive shaft tower arrangement to an infeed drive shaft drive arrangement, as further discussed below (FIG. 4A). However, the shaft 100 can be used for connecting any two machine arrangements, and the examples disclosed herein are not meant to be limiting, unless otherwise stated.

The shaft 100 is formed of two separate sections 102 and 104. The first section 102 (also referred to as the proximal section 102) is configured to connect to a machine arrangement (FIGS. 3A to 4C) at the end 102a. The section 102 can connect to the machine arrangement at the end 102a according to any conventional configuration for connecting a shaft to a machine arrangement. For example, in one or more embodiments, the section 102 can be permanently connected to the machine arrangement. Alternatively, in one or more embodiments, the section 102 can be connected to the machine arrangement in such a manner that requires disassembly of the machine arrangement to remove the section 102.

The second section 104 (also referred to as the distal section 104) is configured to connect to a different machine arrangement (FIGS. 3A to 4C) at the end 104a. The section 104 can similarly connect to the machine arrangement at the end 104a according to any conventional configuration for connecting a shaft to a machine arrangement. For example, in one or more embodiments, the section 104 can be permanently connected to the machine arrangement. Alternatively, in one or more embodiments, the section 104 can be connected to the machine arrangement in such a manner that requires disassembly of the machine arrangement to remove the section 104.

The section 102 has a second end 102b, opposite from the first end 102a, that faces the section 104. Similarly, the section 104 has a second end 104b, opposite from the second end 104a, that faces the section 102. The second ends 102b and 104b are configured to engage with each other so that turning one section (e.g., section 102) also turns the other section (e.g., section 104).

Referring to FIGS. 1B and 1C, the end 102b includes one or more elements 106 that engage with one or more elements 108 of the end 104b. FIGS. 1B and 1C illustrate the elements 106 and 108 partially disengaged for illustrative purposes. The elements 106 and 108 can by any type of elements that mesh or otherwise engage so that rotating one of the sections 102 or 104 rotates the other of the sections 102 or 104. In one or more embodiments, and as illustrated in FIGS. 1B and 1C, the elements 106 and 108 can be pluralities of splines formed of complimentary ridges and grooves. The pluralities of splines of the elements 106 and 108 engage together so that both sections 102 and 104 rotate when turning one section. Accordingly, a first machine arrangement connected to the section 102 can convey drive power, mechanical timing, etc. to a second machine arrangement connected to the section 104 through the engagement of the pluralities of splines of the elements 106 and 108.

Referring to FIG. 1B, in one or more embodiments, the end 104b can have an extension 110, and the plurality of splines of the element 108 can be on an exterior surface of the extension 110. Referring to FIG. 1C, the end 102b can have a corresponding recess 112, and the plurality of splines of the element 106 can be on an interior surface of the recess 112. The extension 110 can be configured to be inserted into the recess 112 to have the elements 106 and 108 engage with each other. Alternatively, the end 104b instead can have the recess 112, and the end 102b instead can have the extension 110.

The shaft 100 may convey rotation that must be mechanically linked or associated with the rotation of another shaft so that multiple components within one machine arrangement driven by the multiple shafts have the correct timing between each other. Such multiple components can be, for example, multiple wheels (e.g., an infeed star wheel, a turret star wheel, etc.). A certain timing must be conveyed by a shaft from the section 102 to the section 104 so that the components driven by the shaft are correctly timed with other components that may be driven by one or more other shafts.

Figure 1D:
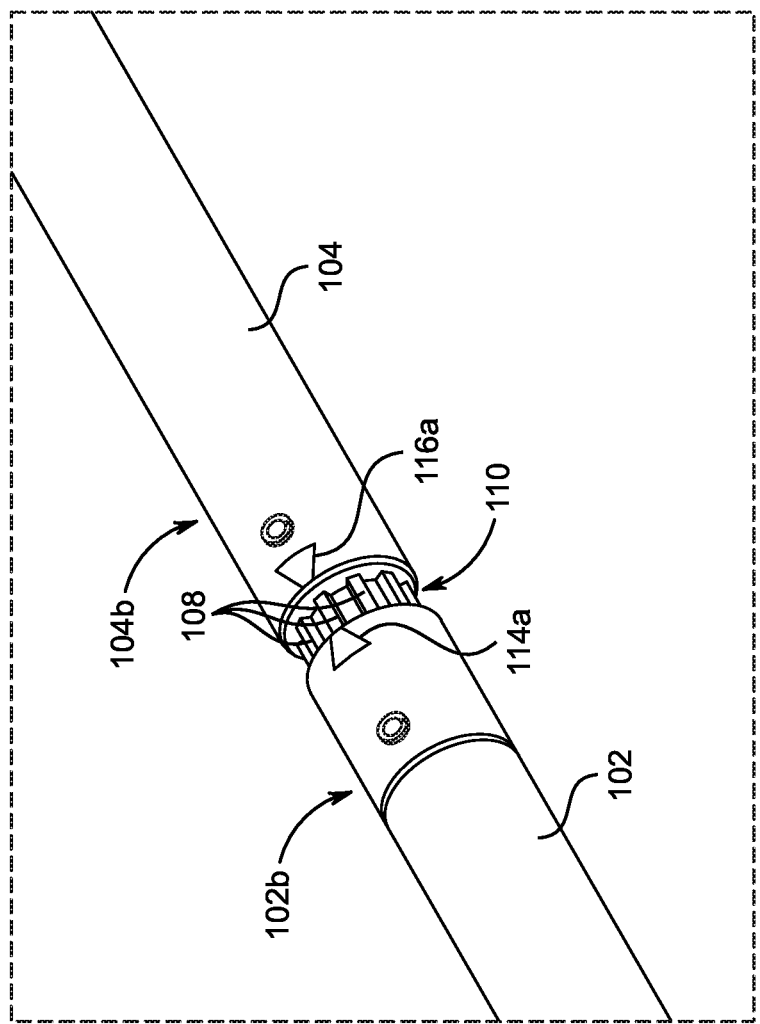
FIG. 1D is a detailed schematic view of an alternative configuration of the split shaft of FIG. 1A, according to an embodiment of the present invention.

Referring to FIG. 1D, in one or more embodiments, the ends 102b and 104b further have a pair of indicators 114a and 116a, respectively, to convey the correct timing between the sections 102 and 104. The indicators 114a and 116a can be any type of indicator that allows for alignment of the rotational positions of the sections 102 and 104. In one or more embodiments, the indicators 114a and 116a can be any type of indicia on the ends 102b and 104b, respectively, that can be aligned when engaging the sections 102 and 104 for proper rotational alignment. The indicia can be any type of visible indicia, such as complimentary marks on the ends 102b and 104b. As illustrated, the indicators 114a and 116b can be arrowhead marks.

The indicators 114a and 116a are configured to be aligned to convey the correct timing between the sections 102 and 104. In other words, the alignment of the indicators 114a and 116a ensures that the sections 102 and 104 engage so that the rotational position of the section 104 matches the rotational position of the section 102, respectively. Correspondingly, the elements that are connected to the section 104 are correctly timed with other elements within the machine arrangement driven by other shafts. Thus, the indicators 114a and 116a assist in properly aligning the sections 102 and 104 so that the correct mechanical timing is conveyed from the section 102 to the section 104.

Besides visible indicia, in one or more embodiments, the indicator 114a can instead be a missing element 106 from the one or more elements 106. For example, the indicator 114a can be a missing spline from the plurality of splines. The indicator 116a similarly can instead be a missing element 108 from the plurality of elements 108, or an element that is configured to engage with the missing element 106 from the one or more elements 106.

Figure 1E:
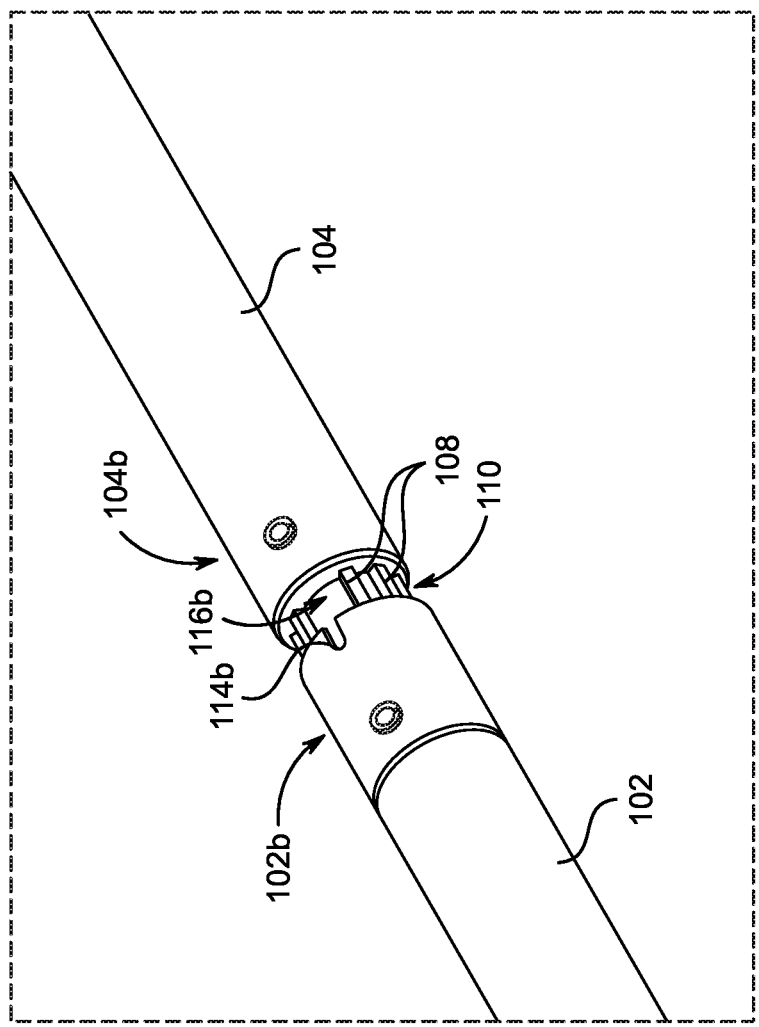
FIG. 1E is a detailed schematic view of another alternative configuration of the split shaft of FIG. 1A, according to an embodiment of the present invention.

FIG. 1E illustrates alternative indicators 114b and 116b, according to one embodiment of the present invention. The indicator 114b (also referred to as the recess indicator 114b) can be a notch within the end 102b. The indicator 116b on the section 104 can be a missing spline on the extension 110. When the recess indicator 114b within the end 102b and the indicator 116b are aligned, the sections 102 and 104 have proper rotational alignment when engaged.

In one or more embodiments, the end 102b can also be missing the corresponding spline (e.g., groove) for the missing spline on the extension 110. In which case, the missing groove can prevent or prohibit any rotational engagement, other than the proper rotational engagement, of the ends 102 and 104 because the missing spline on the end 102b prevents the other splines (e.g., plurality of splines of element 108) on the end 104b from interfacing at the location of the missing groove.

Figure 1F:
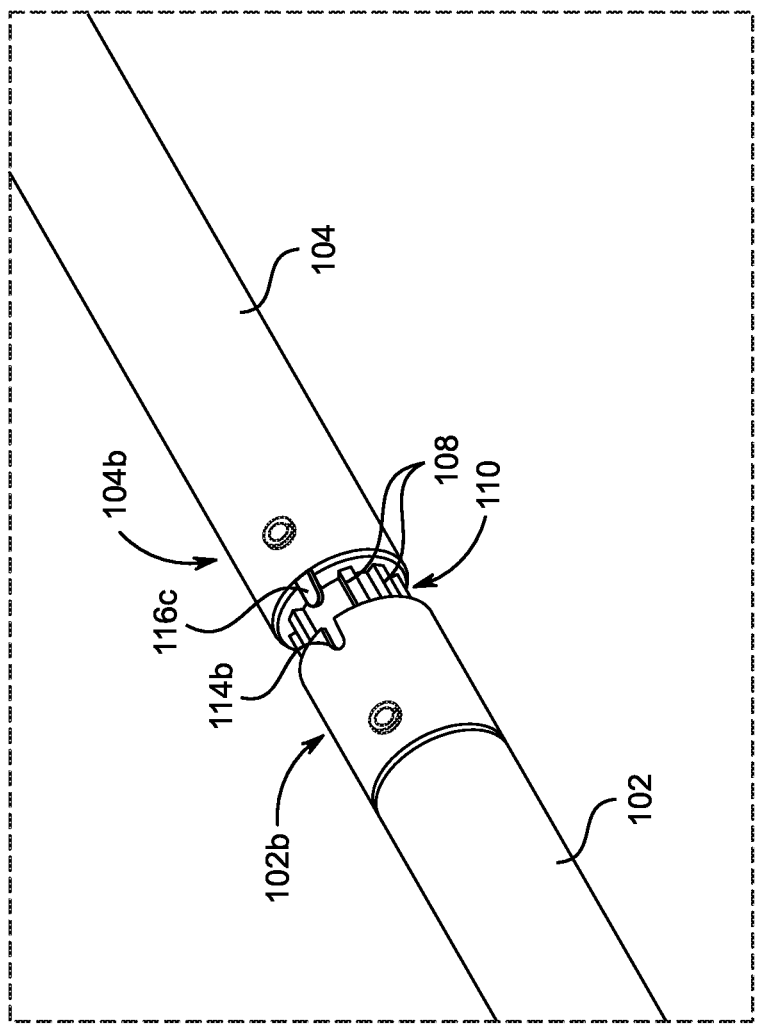
FIG. 1F is a detailed schematic view of another alternative configuration of the split shaft of FIG. 1A, according to an embodiment of the present invention.

FIG. 1F illustrates an alternative indicator 116c in combination with the indicator 114b, according to one embodiment of the present invention. The indicator 116c (also referred to as the projection indicator 116c) can be a projection that extends from the end 104b. The recess indicator 114b and the projection indicator 116c can not only indicate the correct rotational alignment between the sections 102 and 104, respectively, but also prevent or prohibit an incorrect rotational alignment of the sections 102 and 104. In one or more embodiments, the projection indicator 116c can be configured so that, when misaligned with the recess indicator 114b, the projection indicator 116c can prevent the one or more elements 106 and the one or more elements 108 from engaging. For example, the projection indicator 116c can extend the entire length of the extension 110 and prevent the pluralities of splines of the one or more elements 106 and 108 from engaging. Alternatively, in one or more embodiments, the projection indicator 116c can be configured so that, when misaligned with the recess indicator 114b, the projection indicator 116c prevents the one or more elements 106 and 108 from fully engaging. For example, the projection indicator 116c can extend part of the length of the extension 110 and prevent the pluralities of splines of the one or more elements 106 and 108 from fully engaging. The indicators 114b and 116c therefore not only indicate the correct rotational alignment of the sections 102 and 104 but also prohibit the incorrect rotational engagement of the sections 102 and 104. Although only one indicator 114b and one indicator 116c are shown, in one or more embodiments, the sections 102 and 104 can have more than one of the indicators 114b and 116c.

Figure 1G:
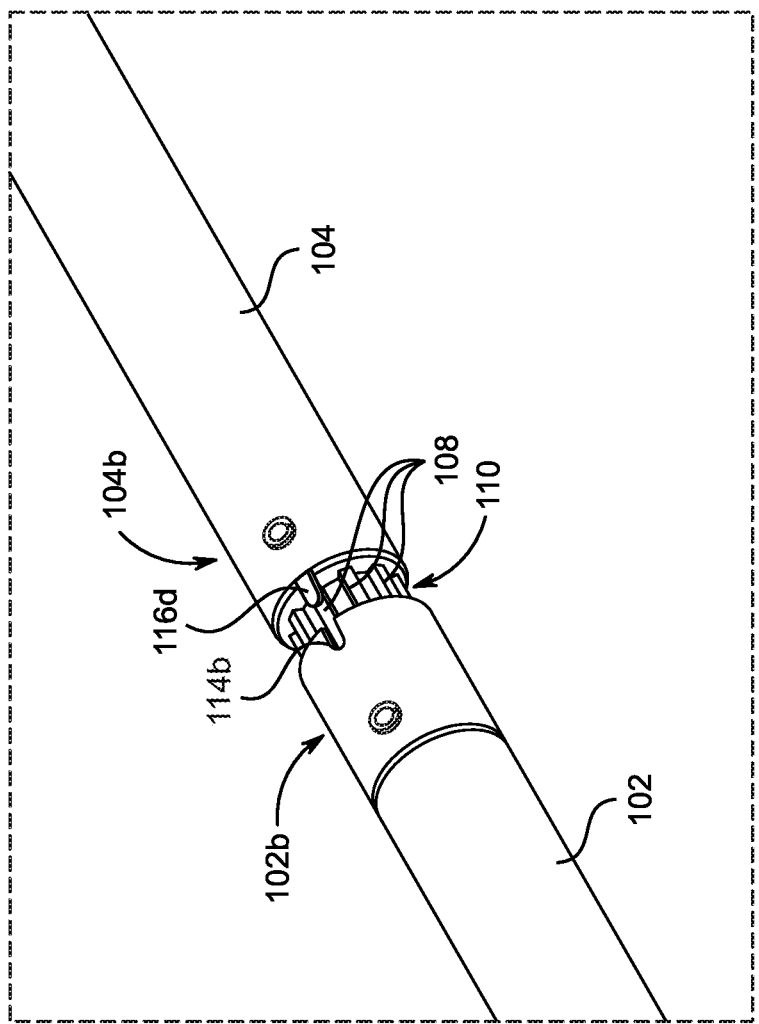
FIG. 1G is a detailed schematic view of another alternative configuration of the split shaft of FIG. 1A, according to an embodiment of the present invention.

FIG. 1G illustrates an alternative projection indicator 116d, according to one embodiment of the present invention. The projection indicator 116d can be similar to the indicator 116c of FIG. 1F. However, the projection indicator 116d can include both the projection of the indicator 116c and the spline 108 that was missing from the indicator 116c. For example, the spline 108 can be vertically aligned with the projection. In which case, although the elements 106 and 108 do not indicate the proper rotational alignment of the sections 102 and 104, the indicators 114b and 114d can indicate the proper rotational alignment of the sections 102 and 104. The indicators 114b and 114d can also prevent or prohibit the improper rotational alignment of the sections 102 and 104, similar to as described above for the indicators 114b and 116c.

In one or more embodiments, the indicators on the section 102 can instead be on the section 104, and the indicators on the section 104 can instead be on the section 102. For example, although the indicators 114a-114c are described as being on the section 102, and the indicators 116a-116d are described as being on the section 104, the indicators 114a-114c can be on the section 104 and the indicators 116a-116d can be on the section 102.

Figure 2A:
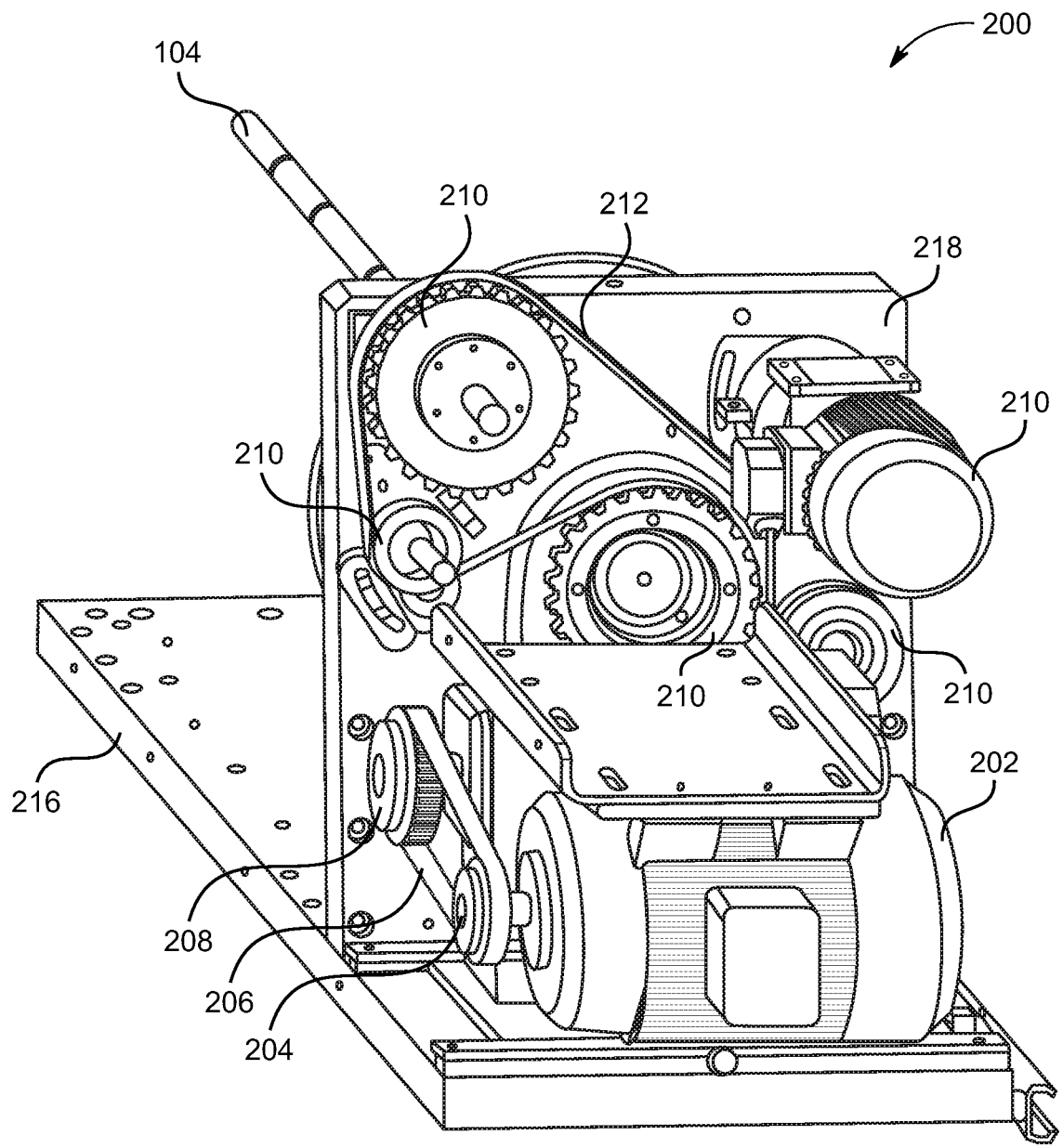
FIG. 2A is a schematic view of a machine arrangement connected to a section of the split shaft of FIG. 1A, according to an embodiment of the present invention.
Figure 2B:
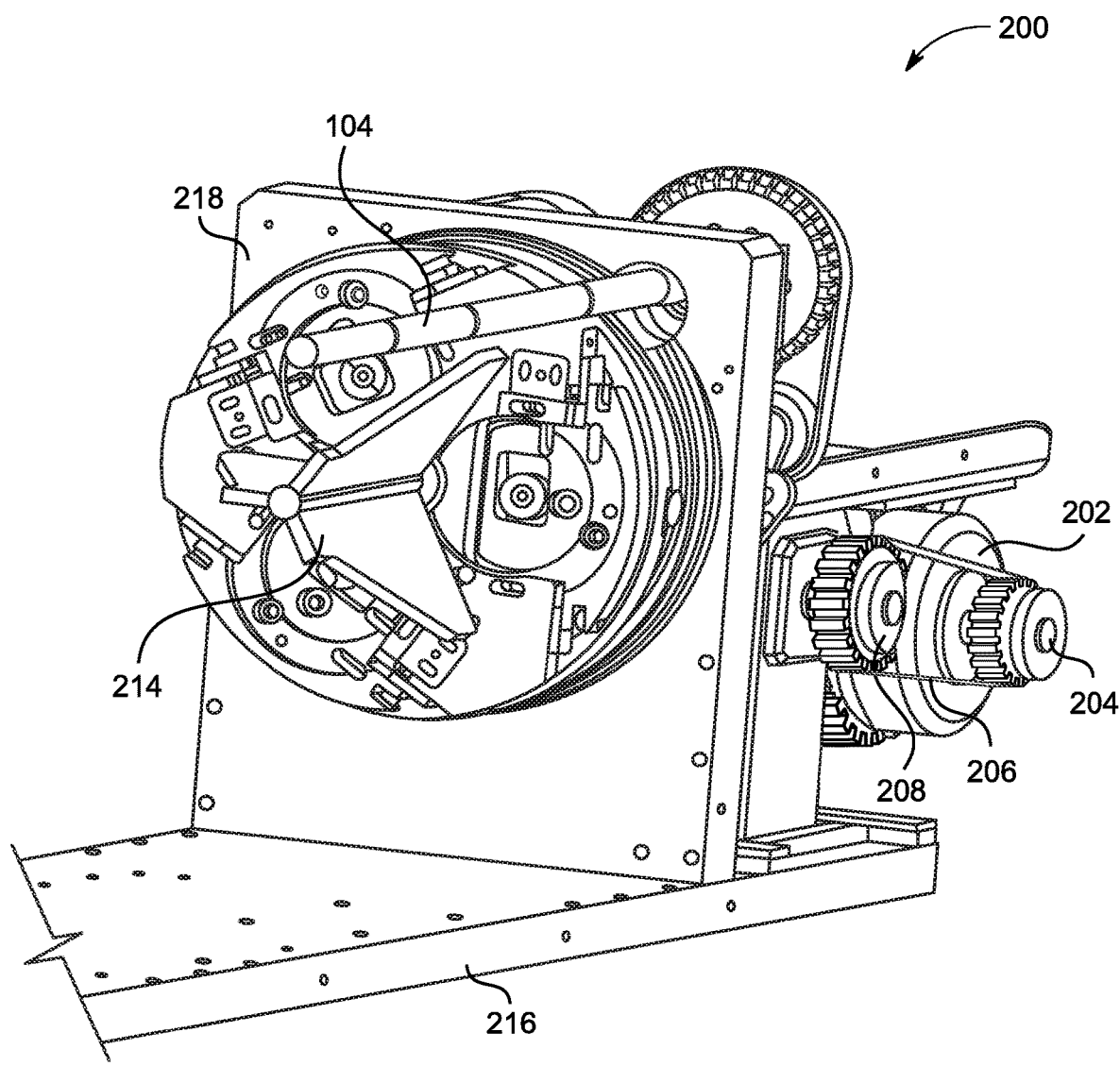
FIG. 2B is another schematic view of the machine arrangement of FIG. 2A, according to an embodiment of the present invention.

FIGS. 2A and 2B are side schematic views of a machine arrangement 200, also referred to as a motor arrangement or an infeed drive shaft drive arrangement, that is configured to provide drive power within a machine line, according to one embodiment of the present invention. It will be understood that this machine arrangement is merely exemplary of one possible motor/drive train arrangement and that the invention is by no way limited to this particular arrangement/layout. The below description and features illustrated in FIGS. 2A and 2B are for explanation purposes only and are not meant to be limiting. The machine arrangement 200 can have fewer or more features and is used merely to explain the operation of the split shaft 100 in connecting two machine arrangements.

The machine arrangement 200 includes a motor 202 that is connected to an output pulley 204. The output pulley 204 is connected via a belt 206 to a gearing input pulley 208. The gearing input pulley 208 drives a series of pulleys 210 via a serpentine belt 212. The series of pulleys 210 cause a main shaft 214 (FIG. 2B) and the section 104 of the split shaft 100 to rotate. The machine arrangement 200 sits on a chassis 216 and some elements of the machine arrangement 200, such as the pulleys 210, are supported by a vertical support 218. The main shaft 214 and the section 104 rotate based on drive power from the motor 202 to provide processing and/or timing to another machine arrangement within the machine line. The main shaft 214 can be a single, conventional shaft. Alternatively, the main shaft 214 can be configured similar to the split shaft 100. However, for purposes of convenience only, the main shaft 214 is described as a single shaft.

Figure 3A:
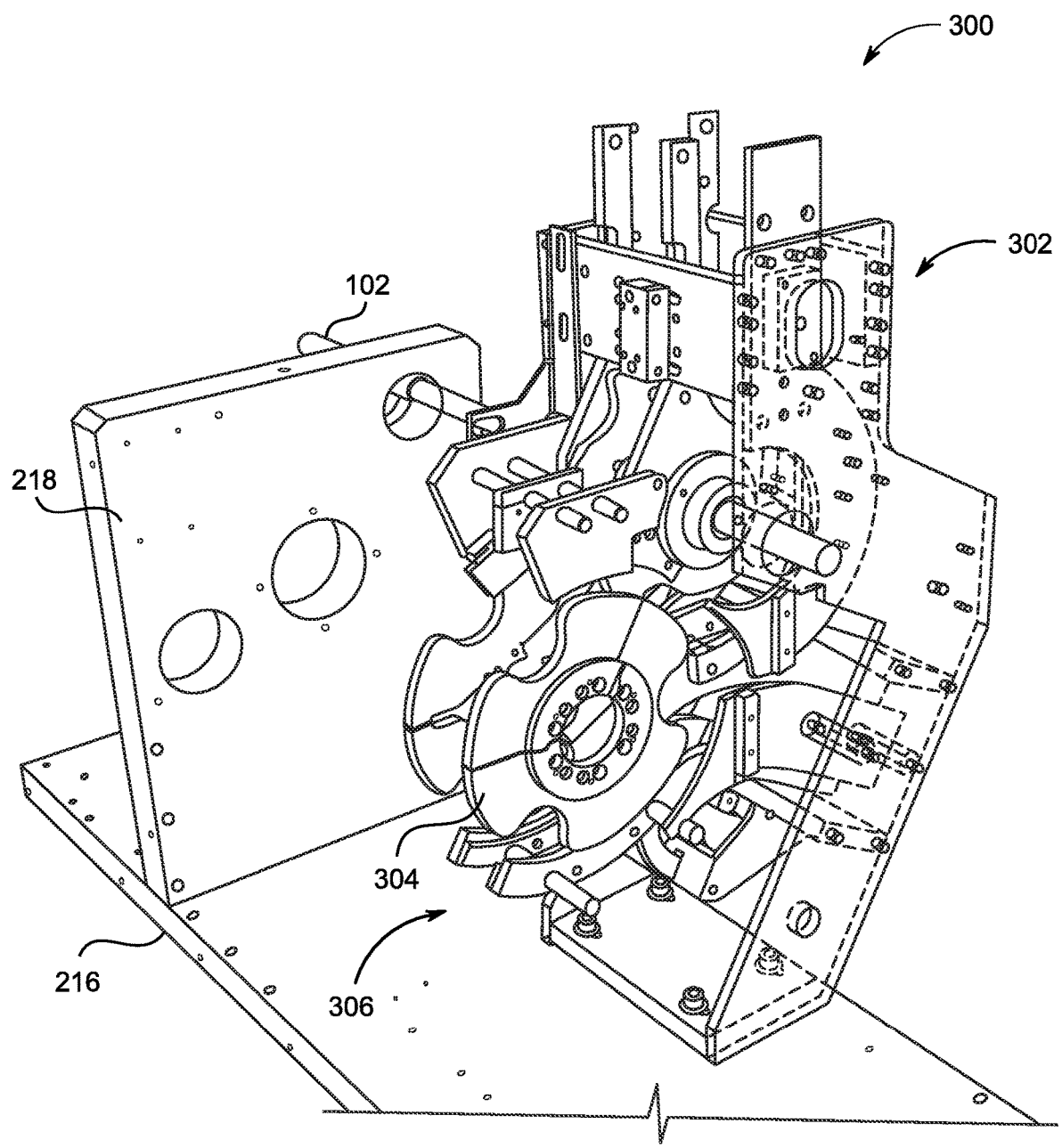
FIG. 3A is a schematic view of another machine arrangement connected to another section of the split shaft of FIG. 1A, according to an embodiment of the present invention.
Figure 3B:
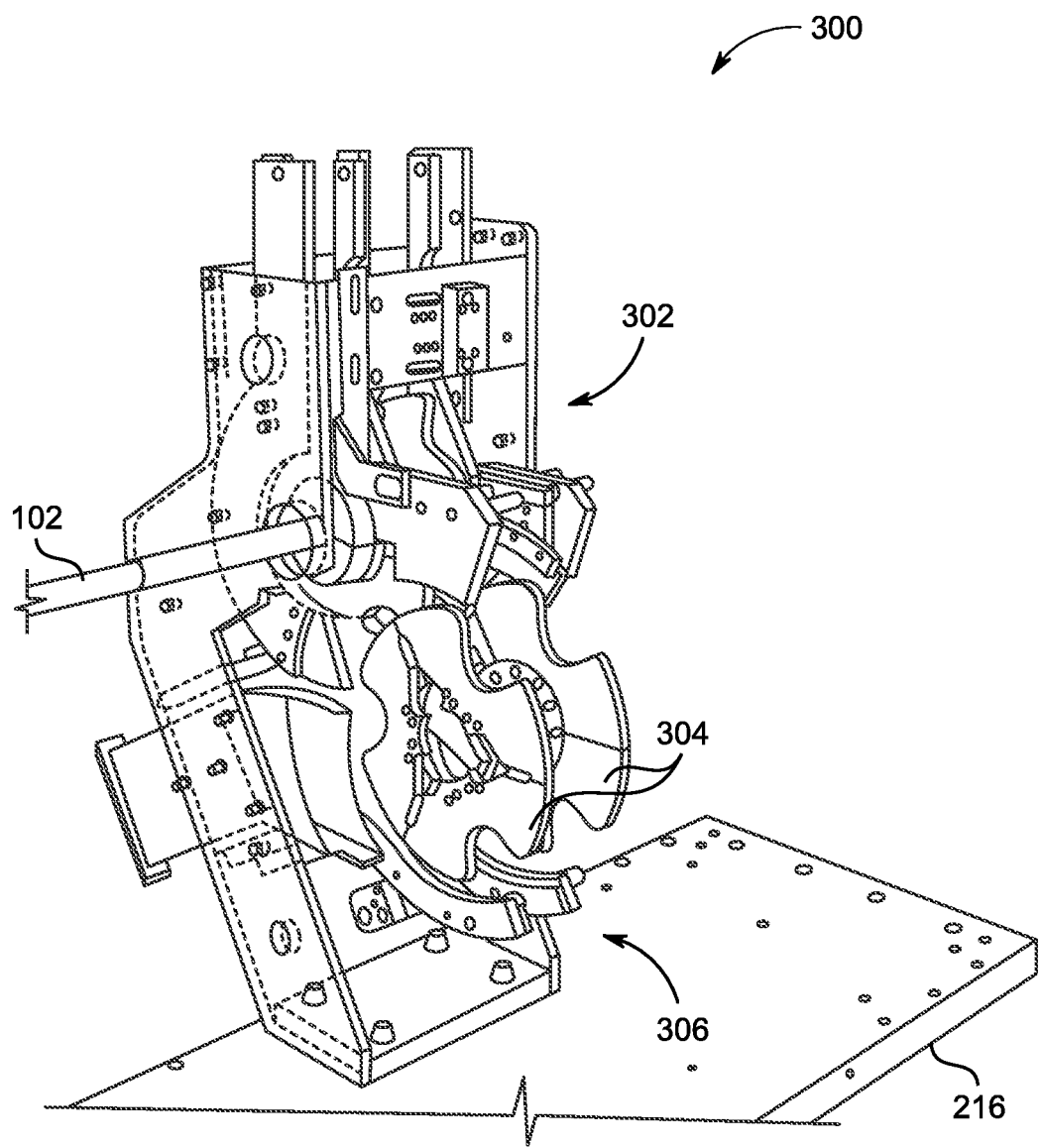
FIG. 3B is another schematic view of the machine arrangement of FIG. 3A, according to an embodiment of the present invention.

FIGS. 3A and 3B are side schematic views of a machine arrangement 300, also referred to as a trimmer infeed drive shaft tower arrangement, according to one embodiment of the present invention. It will be understood that this machine arrangement is merely exemplary of one possible processing machine arrangement and that the invention is by no way limited to this particular arrangement/layout. The below description and features illustrated in FIGS. 3A and 3B are for explanation purposes only and are not meant to be limiting. The machine arrangement 300 can have fewer or more features and is used merely to explain the operation of the split shaft 100 in connecting two machine arrangements.

The machine arrangement 300 is configured to supply articles (e.g., cans) from an infeed star wheel 302 to a main turret star wheel 304. The main turret star wheel 304 supports the articles in position for processing. For example, the main turret star wheel 304 supports the articles in position for trimming by trimming cartridges and subsequently directs the trimmed cans to a discharge chute 306. The infeed star wheel 302 is connected to and driven by the section 102 of the split shaft 100 via the section 102 being engaged with the section 104 of the machine arrangement 200 of FIGS. 2A and 2B. The main turret star wheel 304 is driven by the main shaft 214 of the machine arrangement 200 of FIGS. 2A and 2B. The machine arrangement 300 is connected to the same chassis 216 as the machine arrangement 200.

Figure 4B:
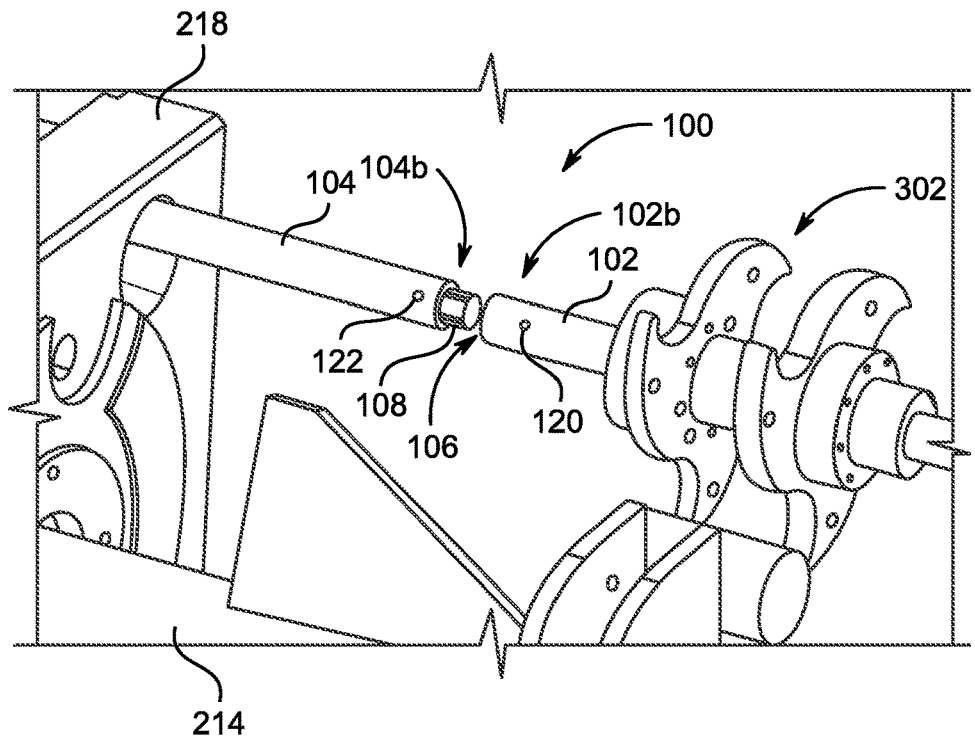
FIG. 4B is a detailed schematic view of the partially engaged split shaft of FIGS. 1A to 1C within the section of the machine line of FIG. 4A, according to an embodiment of the present invention.
Figure 4C:
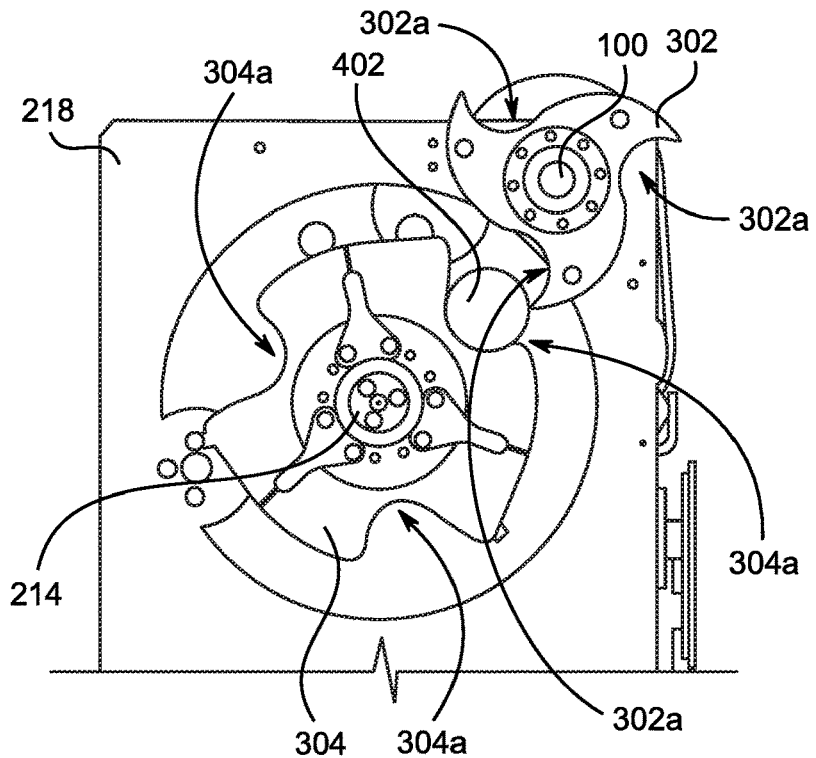
FIG. 4C is a schematic view of the infeed star wheel and the main turret star wheel of the machine line of FIG. 4A, according to an embodiment of the present invention.

FIGS. 4A-4C illustrate a section 400 of a machine line formed of the machine arrangements 200 and 300 of FIGS. 2A-3B, according to one embodiment of the present invention. The machine arrangements 200 and 300 are both secured to the chassis 216 and are connected by the main shaft 214 and the split shaft 100. More specifically, and referring to FIG. 4B, the split shaft 100 is shown with the sections 102 and 104 disengaged. The section 102 is connected to the infeed star wheel 302. The section 104 is connected to one of the pulleys 210 of the machine arrangement 200 to provide drive power and mechanical timing to the infeed star wheel 302. The main shaft 214 is connected at one end to the main turret star wheel 304 and at the other end to the one of the pulleys 210 of the machine arrangement 200 to provide drive power and mechanical timing to the main turret star wheel 304.

The machine arrangement 300 can be removed and replaced with another machine arrangement within the section 400 of the machine line based on simply disengaging the section 102 from the section 104 of the split shaft 100 and removing the machine arrangement 300 from the chassis 216. However, the sections 102 and 104 do not need to be removed from their respective machine arrangements 200 and 300. Accordingly, one or more of the machine arrangements 300 and 400 do not need to be disassembled to remove or disengage the sections 102 and 104. Instead, the sections 102 and 104 simply can be disengaged from each other. Moreover, because the machine arrangements 200 and 300 are coupled to the chassis 216, the sections 102 and 104 do not need to be coupled together. Instead, the sections 102 and 104 merely need to be engaged at their ends 102b and 104b by engagement of the elements 106 and 108 to convey drive power, mechanical timing, etc. between the machine arrangements 200 and 300. However, in one or more embodiments, the sections 102 and 104 can be coupled together. For example, referring to FIG. 4B, the end 102b of the section 102 can include an aperture 120 that a removable fastener (e.g., screw) can fit within to couple the section 102 to the section 104 when both are engaged. In one or more embodiments, the section 104 can include a similar aperture 122 for coupling the sections 102 and 104 together when engaged. In one or more embodiments, the apertures 120 and 122 can overlap when the sections 102 and 104 are engaged, and a single fastener can be inserted into both apertures 120 and 122 to couple the sections 102 and 104 together.

Referring to FIG. 4C, an article 402 is transferred between the infeed star wheel 302 and the main turret star wheel 304. Because the article 402 must be passed from a pocket 302a of the infeed star wheel 302 to a pocket 304a of the main turret star wheel 304, the mechanical timing must be correct (e.g., in agreement) between the infeed star wheel 302 and the main turret star wheel 304. Accordingly, the timing of the main shaft 214 and the split shaft 100 must be correct because both are driven by the interconnected pulleys 210 of the machine arrangement 200. The mechanical timing of the split shaft 100 can be set when connecting the section 102 to the section 104, such as when adding the machine arrangement 300 to the section 400 of the machine line, by ensuring that the indicators 114a and 116a (or 114b and 116b) discussed above are aligned. If they are not aligned when bringing the sections 102 and 104 together, a user can simply manually rotate, for example, the section 102 until the indicators 114a and 116a become aligned.

Based on the ability to disengage the sections 102 and 104 of the split shaft 100, the engaging/disengaging of the split shaft 100 eliminates the additional disassembly/reassembly required for a non-split shaft design. In the context of using the split shaft 100 as an infeed drive shaft, the split shaft 100 provides the additional benefit of reducing the change over time for complete trimmer infeed/discharge tower assemblies. The split shaft 100 also reduces the change over time for height and diameter changes when existing infeed/discharge tower assemblies are reused. The split shaft 100 also eliminates the need to retime the infeed star wheel to the main turret star wheel if infeed/discharge tower maintenance and or infeed star wheel work is required. The split shaft 100 also eliminates the need to retime the infeed star wheel to the main turret star wheel if the trimmer infeed shaft drive requires maintenance. Again, although the present disclosure describes the split shaft 100 with respect to an infeed section, the split shaft 100 can replace any rotating shaft assembly that would benefit from a quick-change, engaging/disengaging design.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the machine module and/or machine arrangement as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions, and arrangement of the various exemplary embodiments without departing from the scope of the present invention.

The invention claimed is:

1. A section of a machine line configured to process articles, the section comprising:
   a first machine arrangement configured to provide drive power;
   a second machine arrangement configured to process the articles within the section of the machine line; and
   a split shaft configured to convey the drive power from the first machine arrangement to the second machine arrangement, to power the processing, at least in part, of the articles by the second machine arrangement, the split shaft comprising:
      a proximal shaft section having a first proximal shaft end and a second proximal shaft end, the first proximal shaft end being configured to couple to the first machine arrangement; and
      a distal shaft section having a first distal shaft end and a second distal shaft end, the first distal shaft end being configured to couple to the second machine arrangement, the second distal shaft end being configured to engage with the second proximal shaft end to convey the drive power from the first machine arrangement to the second machine arrangement,
      wherein the second proximal shaft end includes a first plurality of splines, the second distal shaft end includes a second plurality of splines, and the first plurality of splines engages with the second plurality of splines to convey the drive power from the first machine arrangement to the second machine arrangement,
      wherein the second proximal shaft end includes a first indicator, and the second distal shaft end includes a second indicator, and alignment of the first indicator and the second indicator conveys timing for the drive power, and
      wherein the first indicator of the second proximal shaft end includes a projection, and the second indicator of the second distal shaft end includes a notch that receives the projection.

2. The section of claim 1, wherein the first indicator of the second proximal shaft end includes a notch, and the second indicator on the second distal shaft end includes a missing spline.

3. The section of claim 1, wherein the first indicator of the second proximal shaft end includes a first mark, and the second indicator of the second distal shaft end includes a second mark.

4. The section of claim 1, wherein the first indicator of the second proximal shaft end includes a missing spline from among the first plurality of splines, and the second indicator of the second distal shaft end includes a notch.

5. The section of claim 1, wherein the first indicator of the second proximal shaft end includes a missing spline from among the plurality of splines.

6. The section of claim 1, wherein the second indicator of the second distal shaft end includes a missing spline from among the first plurality of splines.

7. The section of claim 1, wherein the second indicator of the second proximal shaft end includes a spline.

8. The section of claim 1, wherein the first machine arrangement is an infeed drive shaft drive arrangement.

9. The section of claim 1, wherein the second machine arrangement is a trimmer infeed drive shaft tower arrangement.

10. The section of claim 1, wherein the proximal shaft section and the distal shaft section are configured to couple together with the second distal shaft end engaged with the second proximal shaft end.

11. The section of claim 1, wherein the proximal shaft section and the distal shaft section are configured to not couple together with the second distal shaft end engaged with the second proximal shaft end.

12. A split shaft configured to convey drive power from a first machine arrangement within a machine line to a second machine arrangement within the machine line to power the processing, at least in part, of the articles by the second machine arrangement, the split shaft comprising:
   a proximal shaft section having a first proximal shaft end and a second proximal shaft end, the first proximal shaft end being configured to couple to the first machine arrangement; and
   a distal shaft section having a first distal shaft end and a second distal shaft end, the first distal shaft end being configured to couple to the second machine arrangement, the second distal shaft end being configured to engage with the second proximal shaft end to convey the drive power from the first machine arrangement to the second machine arrangement,
   wherein the second proximal shaft end includes a first plurality of splines, the second distal shaft end includes a second plurality of splines, and the first plurality of splines engages with the second plurality of splines to convey the drive power from the first machine arrangement to the second machine arrangement,
   wherein the second proximal shaft end includes a first indicator, and the second distal shaft end includes a second indicator, and alignment of the first indicator and the second indicator conveys timing for the drive power, and
   wherein the first indicator of the second proximal shaft end includes a projection, and the second indicator of the second distal shaft end is a notch that receives the projection.

13. The shaft of claim 12, wherein the first indicator of the second proximal shaft end includes a notch, and the second indicator on the second distal shaft end includes a missing spline.

14. The shaft of claim 12, wherein the first indicator of the second proximal shaft end includes a first mark, and the second indicator of the second distal shaft end includes a second mark.

15. The shaft of claim 12, wherein the first indicator of the second proximal shaft end includes a missing spline from among the first plurality of splines, and the second indicator of the second distal shaft end includes a notch.

16. The shaft of claim 12, wherein the first indicator of the second proximal shaft end is a missing spline from among the plurality of splines.

17. The shaft of claim 12, wherein the second indicator of the second distal shaft end includes a missing spline from among the first plurality of splines.

18. The shaft of claim 12, wherein the second indicator of the second proximal shaft end is a spline.

19. The shaft of claim 12, wherein the first machine arrangement is an infeed drive shaft drive arrangement.

20. The shaft of claim 12, wherein the second machine arrangement is a trimmer infeed drive shaft tower arrangement.

21. The shaft of claim 12, wherein the proximal shaft section and the distal shaft section are configured to couple together with the second distal shaft end engaged with the second proximal shaft end.

22. The shaft of claim 12, wherein the proximal shaft section and the distal shaft section are configured to not couple together with the second distal shaft end engaged with the second proximal shaft end.

\* \* \* \* \*